(12) United States Patent
Kim

(10) Patent No.: US 10,330,562 B2
(45) Date of Patent: Jun. 25, 2019

(54) APPARATUS FOR TESTING WATERPROOFNESS OF HALF-FINISHED PRODUCT

(71) Applicant: DMC CO., LTD., Hwaseong-si (KR)

(72) Inventor: Dong Un Kim, Incheon (KR)

(73) Assignee: DMC CO., LTD., Gyeonggi-Do (KR)

( * ) Notice: Subject to any disclaimer, the term of this patent is extended or adjusted under 35 U.S.C. 154(b) by 175 days.

(21) Appl. No.: 15/683,116

(22) Filed: Aug. 22, 2017

(65) Prior Publication Data
US 2018/0120195 A1    May 3, 2018

(30) Foreign Application Priority Data

Oct. 28, 2016   (KR) .................. 10-2016-0141663
Nov. 4, 2016    (KR) .................. 10-2016-0147026

(51) Int. Cl.
*G01M 3/32*    (2006.01)
*G01M 3/26*    (2006.01)
*H04M 1/24*    (2006.01)
*H04M 1/18*    (2006.01)

(52) U.S. Cl.
CPC ............ *G01M 3/3281* (2013.01); *G01M 3/26* (2013.01); *H04M 1/24* (2013.01); *H04M 1/18* (2013.01)

(58) Field of Classification Search
CPC ............................ G01M 3/329; G01M 3/3209
See application file for complete search history.

(56) References Cited

U.S. PATENT DOCUMENTS

| 5,241,852 | A | * | 9/1993 | Takahashi | G01M 3/10 |
| | | | | | 73/45.5 |
| 5,287,727 | A | * | 2/1994 | Nickerson, Jr. | G01M 3/02 |
| | | | | | 73/37 |
| 9,835,517 | B2 | * | 12/2017 | Lee | G01M 3/329 |
| 2007/0157457 | A1 | * | 7/2007 | Fried | G01M 3/3281 |
| | | | | | 29/592.1 |
| 2010/0154516 | A1 | * | 6/2010 | Hattori | G01M 3/329 |
| | | | | | 73/40.7 |
| 2012/0125085 | A1 | * | 5/2012 | Wu | G01M 3/329 |
| | | | | | 73/38 |

FOREIGN PATENT DOCUMENTS

| KR | 101197704 | 11/2012 |
| KR | 101598849 | 3/2016 |

* cited by examiner

*Primary Examiner* — Paul M. West
*Assistant Examiner* — Mark A Shabman
(74) *Attorney, Agent, or Firm* — Cantor Colburn LLP

(57) ABSTRACT

Provided is an apparatus for testing waterproofness of a half-finished product, wherein the apparatus is configured to form a chamber space such that areas of holes and parts of the half-finished product are separated from each other, and high-pressure air is injected into the chamber space, thereby performing a waterproofness test. In addition, a sliding block is provided such that a hole blocking means blocking the holes of the half-finished product is moved forward and backward through engagement and disengagement of a body and a cover without requiring a separate power, and the apparatus includes the body, the cover, a sealing means, and a hole blocking means including a sliding block moved in a lateral direction of the half-finished product, a blocking member blocking a side hole of the holes, and a pushing member pushing the sliding block to be moved forward when the body and the cover are combined.

4 Claims, 8 Drawing Sheets

APPARATUS FOR TESTING WATERPROOFNESS OF HALF-FINISHED PRODUCT

CROSS REFERENCE TO RELATED APPLICATION

The present application claims priority to Korean Patent Application No. 10-2016-0147026, filed Nov. 4, 2016 and Korean Patent Application No. 10-2016-0141663, filed Oct. 28, 2016, the entire contents of which is incorporated herein for all purposes by this reference.

BACKGROUND OF THE INVENTION

Field of the Invention

The present invention relates generally to an apparatus for testing waterproofness of a half-finished product. More particularly, the present invention relates to an apparatus for testing waterproofness of a half-finished product, in which the apparatus is configured to form a chamber space such that areas of holes and parts of the half-finished product are separated from each other, and high-pressure air is injected into the chamber space, thereby performing a waterproofness test on the half-finished product. In addition, a sliding block is provided such that a hole blocking means blocking the holes of the half-finished product is naturally moved forward and backward through engagement and disengagement of a body and a cover without requiring a separate power.

Description of the Related Art

Since a mobile terminal such as a smartphone is carried and used by a user, it may come into contact with water at any time. In addition, since it has therein electronic parts that are vulnerable to water, waterproofness has become a major factor in determining the quality of portable terminals that are becoming increasingly expensive.

Accordingly, manufacturers of portable terminals have been concentrating on making a terminal with a life waterproof function even though it is not completely waterproof. In other words, much investment has been put into manufacturing a terminal that is life waterproof such that water is prevented from entering the inside of the terminal when the terminal comes into contact with water for a relatively short period of time.

The present applicant proposed a waterproofness testing apparatus that can perform faster and more accurate waterproofness testing on a terminal with a waterproof function without causing damage to the terminal due to the waterproof test, which is disclosed in Korean Patent No. 10-1197704, entitled "Apparatus inspecting waterproofness of mobile" (prior art 1).

In general, such a waterproofness testing apparatus according to the prior art including the prior art 1, tests waterproofness of a finished product terminal. However, it is also very important to test waterproofness of a half-finished product that is manufactured before completing the manufacturing process of the finished product terminal.

In the case of the half-finished product, the waterproof function is lowered when there is a gap in a mounting area between parts and an injection-molded product, or when there is a gap in the part itself.

Accordingly, when a finished product is manufactured using a half-finished product having a waterproofness problem, the finished product eventually is lowered in waterproof function. In this case, the finished product may be discarded, or may be disassembled to separate the half-finished product.

In other words, in the case of testing waterproofness of a finished product having the waterproofness problem, a subsequent manufacturing process after the manufacturing process of the half-finished product may be unnecessarily performed. Accordingly, parts added for manufacturing the finished product after the manufacturing process of the half-finished product may be wasted, and a process of disassembling the finished product may be further required.

Thus, it is necessary to solve the above problems by also testing waterproofness of the half-finished product before the finished product is obtained.

Accordingly, the present applicant proposed Korean Patent No. 10-1598849, entitled "Device for checking leakage of half-finished product" (prior art 2), and through this, the waterproofness test was performed on the half-finished product. Thus, the problem that resources and labor costs are wasted due to the subsequent process of manufacturing the finished product using the half-finished product having the waterproofness problem was solved.

The prior art 2 discloses a technique in which a rubber block is provided to block holes of the half-finished product, and high-pressure (compressed) air is injected onto the rubber block such that the rubber block is allowed to move forward and backward.

However, the prior art 2 is problematic in that since the holes of the half-finished product are blocked through the air injection method, the number of parts for air injection is increased, and manufacturing cost of the apparatus is increased. In addition, high precision is required to prevent leakage of compressed air, and a jig (seat part) is increased in volume.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and an object of the present invention is to propose an apparatus for testing waterproofness of a half-finished product, in which forward and backward movement of a sliding block provided with a blocking member blocking holes of the half-finished product is implemented such that a rear end of the sliding block is pressed by a pushing member provided on a lower surface of a cover, thereby reducing the number of parts, reducing manufacturing cost of the apparatus, reducing sensitivity to leakage of compressed air, and reducing volume of the jig.

In order to achieve the above object, according to one aspect of the present invention, there is provided an apparatus for testing waterproofness of a half-finished product, the apparatus including: a body provided with a seat part on which a half-finished product having a plurality of holes formed therein and a plurality of parts mounted thereon is seated; a cover covering the body; a sealing means including a sealing pad provided between the body and the cover and sealing inner and outer surfaces of the half-finished product such that areas of the holes and the parts of the half-finished product are separated from each other, the sealing means being configured to form a chamber space for testing waterproofness of the parts; and a hole blocking means including a sliding block provided on an outer periphery of the seat part and moved in a lateral direction of the half-finished product by forward and backward movement, a blocking member provided at a front end of the sliding block and blocking a side hole of the holes of the half-finished product, the side hole being formed on a side of the half-finished product, and a pushing member provided on a lower surface of the cover and pushing the sliding block to move the sliding block forward when the body and the cover are coupled to each other.

The sliding block may be provided at a rear end thereof with a first inclined portion inclined downward and rearward, and the pushing member may be provided with a second inclined portion corresponding to the first inclined portion, the second inclined portion coming into contact with the first inclined portion when the body and the cover are coupled to each other.

The hole blocking means may further include an elongated guide hole formed at the sliding block, and a guide member coupled at an end thereof to the body and inserted into the guide hole such that a center portion of the guide member passes through the guide hole, so the guide member restricts the sliding block.

The body may be provided with an installation surface on which the sliding block is installed, the installation surface being provided with a return member at a position corresponding to a lower portion of the rear end of the sliding block, the return member returning the sliding block and being made of a magnetic material.

According to the present invention having the above-configuration and features, forward and backward movement of the sliding block provided with the blocking member blocking the holes of the half-finished product is implemented such that the rear end of the sliding block is pressed by the pushing member provided on the lower surface of the cover. Thus, requirement of a separate power for the forward and backward movement of the sliding block can be eliminated, and thus it is possible to reduce the number of parts required for providing the separate power, to reduce manufacturing cost of the apparatus, to reduce sensitivity to leakage of compressed air, and to minimize volume of the jig.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

The present invention will now be described in detail based on aspects (or embodiments). The present invention may, however, be embodied in many different forms and should not be construed as being limited to only the embodiments set forth herein, but should be construed as covering modifications, equivalents or alternatives falling within ideas and technical scopes of the present invention.

The terminology used herein is for the purpose of describing particular aspects (or embodiments) only and is not intended to be limiting of the present invention. As used herein, the singular forms are intended to include the plural forms as well, unless the context clearly indicates otherwise. It will be further understood that the terms "comprises", "comprising", "includes", and/or "including" when used herein, specify the presence of stated features, integers, steps, operations, elements, and/or parts, but do not preclude the presence or addition of one or more other features, integers, steps, operations, elements, parts, and/or groups thereof.

Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

Terms such as "a first ~" and "a second ~" are used only for the purpose for distinguishing a constitutive element from other constitutive element, but constitutive elements should not be limited to a manufacturing order, and the terms described in the detailed description of the invention may not be consistent with those described in the claims.

The present invention relates to an apparatus for testing waterproofness of a half-finished product, in which the apparatus is configured to form a chamber space such that areas of holes and parts of the half-finished product are separated from each other, and high-pressure air is injected into the chamber space, thereby performing a waterproofness test on the half-finished product. In addition, a sliding block is provided such that a hole blocking means blocking the holes of the half-finished product is naturally moved forward and backward through engagement and disengagement of a body and a cover without requiring a separate power.

Hereinafter, an apparatus (hereinbelow, apparatus D) for testing waterproofness of a half-finished product according to the present invention will be described in detail with reference to the accompanying drawings.

Figure 1:
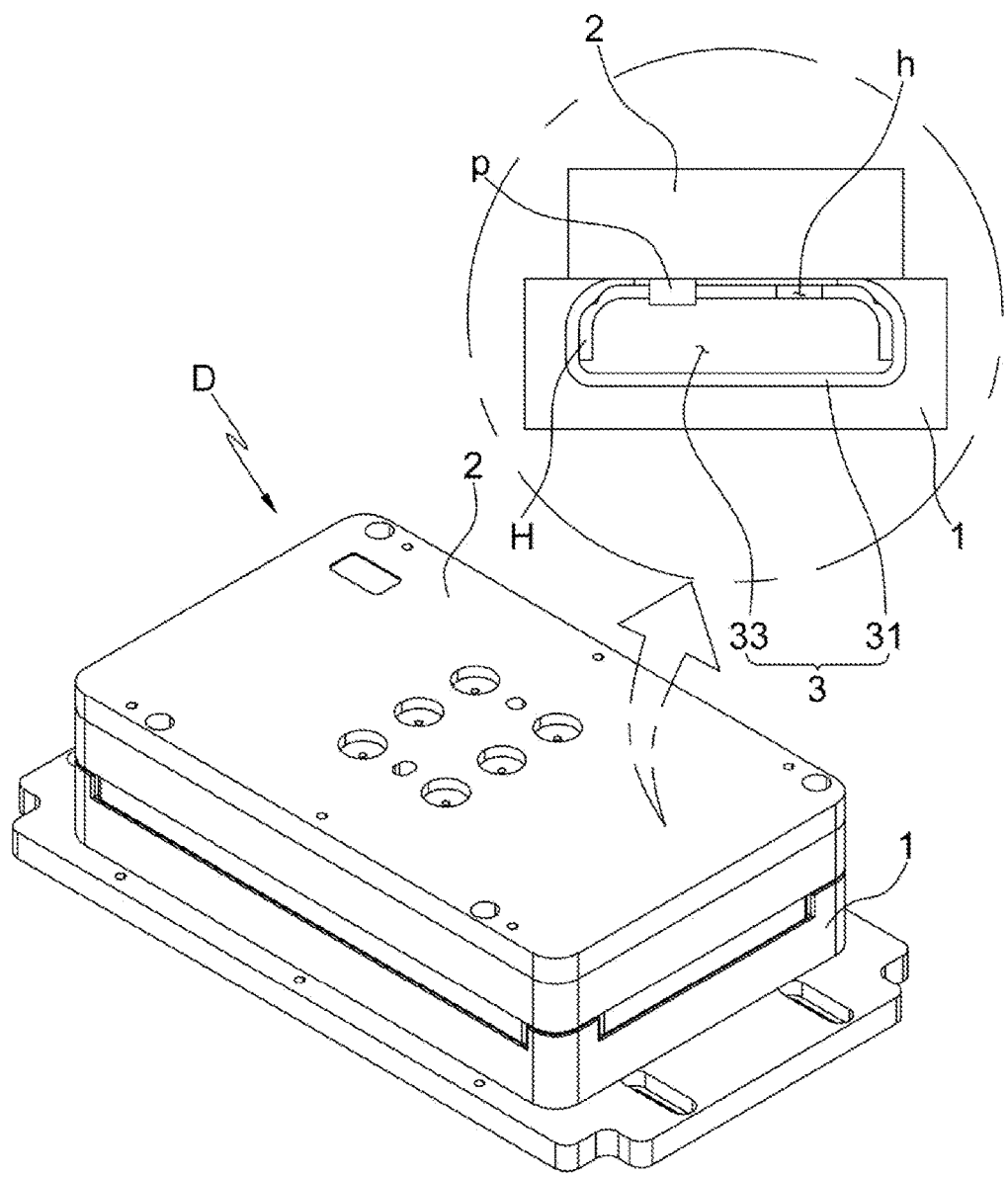
FIG. 1 is a perspective view showing an outer shape of the present invention.
Figure 2A:
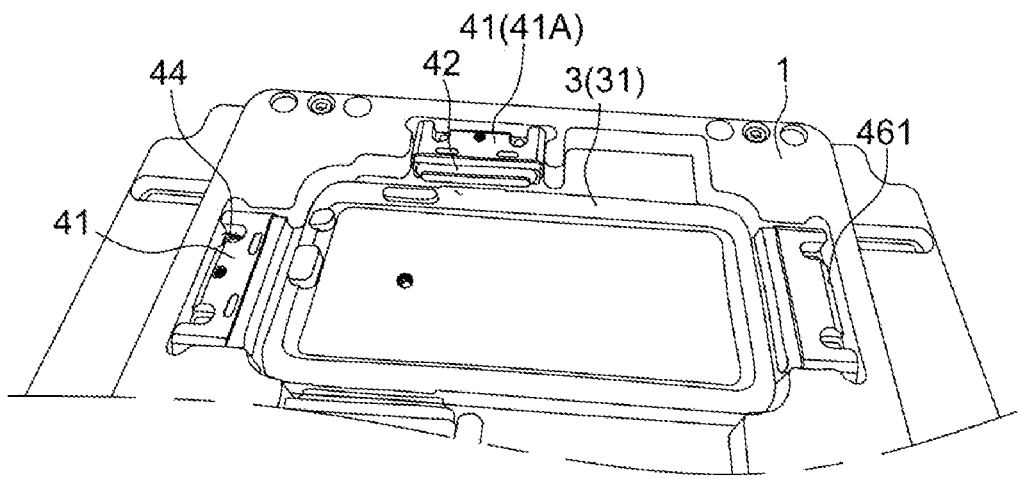
FIGS. 2A and 2B are exploded views of the present invention (body-cover separation)
Figure 2B:
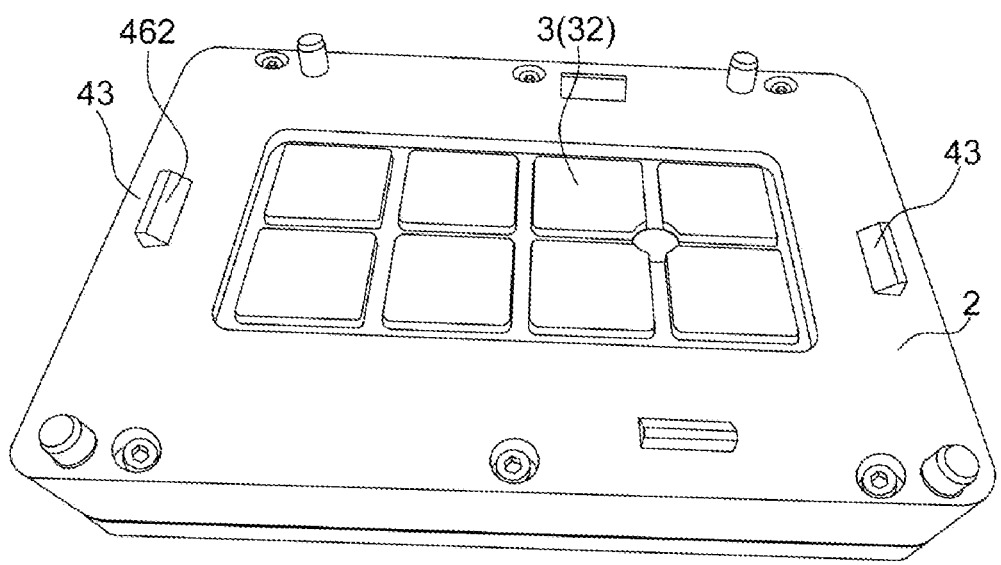
Figure 3A:
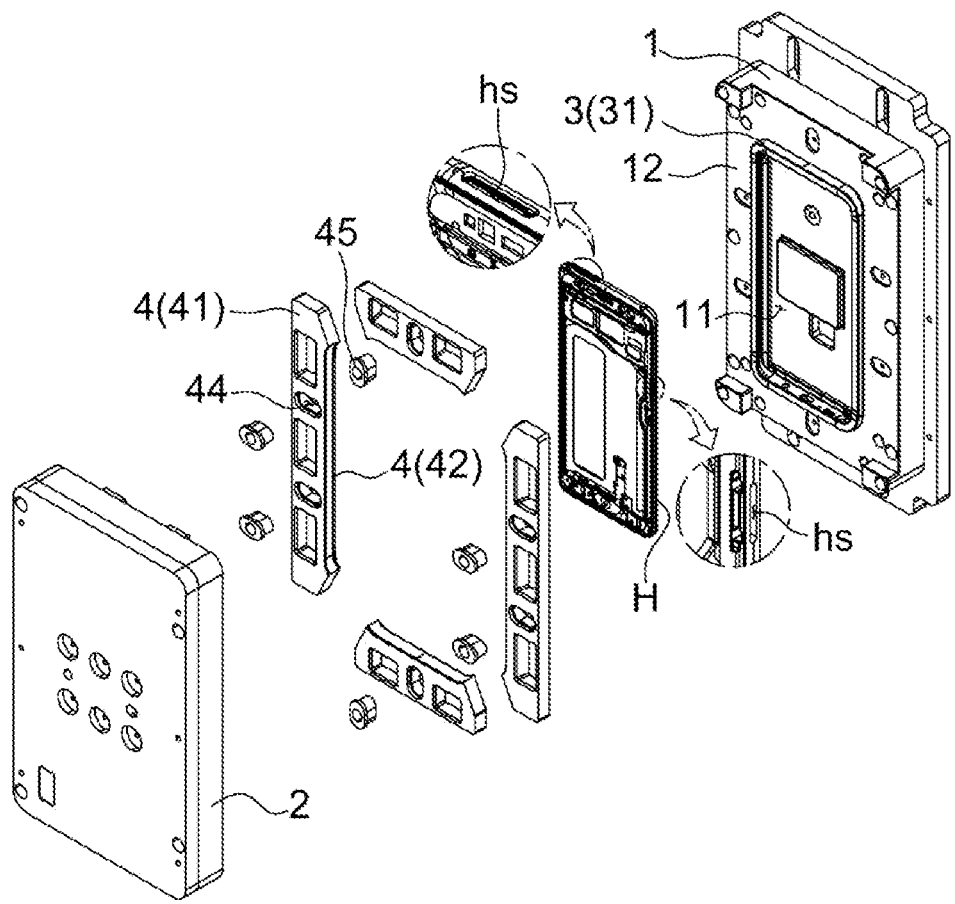
FIGS. 3A and 3B are exploded perspective views of the present invention.
Figure 3B:
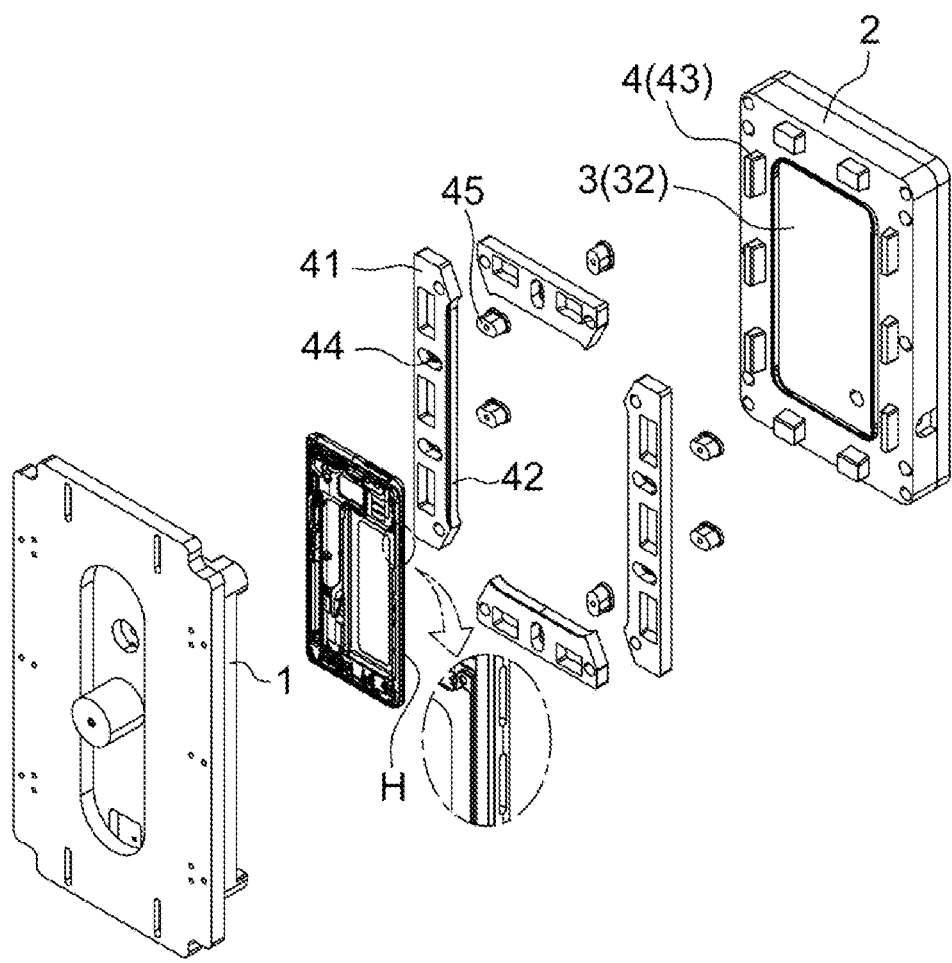

FIG. 1 is a perspective view showing an outer shape of the present invention, FIGS. 2A and 2B are exploded views showing an internal structure of the present invention in a state in which the body 1 and the cover 2 are separated, and FIGS. 3A and 3B are exploded perspective views of the present invention.

As shown in FIGS. 1 to 3B, the apparatus D includes the body 1, the cover 2, a sealing means 3, and the hole blocking means 4.

More specifically, the body 1 is configured to receive therein the half-finished product H, and is provided with a seat part 11 on which the half-finished product H is seated.

Here, the half-finished product H refers to a product that is partially completed in the assembling process before a finished product is obtained. In general, the half-finished product H includes an injection-molded product providing a base, various parts p coupled to the injection-molded product, and a plurality of holes h into which other parts p are mounted in a subsequent process, or into which other products are mounted, or used for bolt engagement.

The half-finished product H does not have a space formed therein unlike the finished product, so a chamber space 33 for sensing a pressure change is required. Here, the sealing means 3 and the hole blocking means 4 that will be described later are provided to prevent leakage of air injected into the chamber space 33.

As confirmed in FIGS. 2A to 3B, the seat part 11 is depressed to correspond to an outer shape of the half-finished product H, such that the half-finished product H is held in the seat part 11 without being positionally deviated.

In addition, as shown in FIGS. 2A to 3B, the body 1 is provided with an installation surface 12 on which a sliding block 41 that will be described later is installed. The installation surface 12 may be provided on an outer periphery of the seat part 11, and depending on the embodiment, the installation surface may be provided entirely on the outer periphery of the seat part 11 or may be provided partially on the outer periphery of the seat part 11.

Next, the cover 2 covers the body 1 and is coupled to an upper part of the body 1 to cover the upper part of the body 1.

The cover 2 may be coupled to the body 1 by various assembly methods such as screw engagement of bolt/screw hole or fitting engagement of a protrusion/groove.

As confirmed in FIGS. 2A to 3B, the cover 32 is provided on a lower surface thereof with a sealing part 32 and a pushing member 43. A detailed description of the sealing part 32 and the pushing member 43 will be described later.

Next, the sealing means 3 is configured to form the chamber space 33 for testing waterproofness of the parts p. The sealing means 3 includes a sealing pad 31 provided between the body 1 and the cover 2 and sealing inner and outer surfaces of the half-finished product H such that areas of the holes h and the parts p of the half-finished product H are separated from each other.

Moreover, the sealing means 3 further includes the sealing part 32 provided on the lower surface of the cover 2. The sealing part 32 is configured to seal an upper surface of the half-finished product H, and the lower surface of the cover 2 itself may be provided with the sealing part 32, or may have a groove/protrusion structure corresponding to the upper surface of the half-finished product H.

The sealing pad 31 seals the holes h and the parts p of the half-finished product H rather than fully sealing the outer surface of the half-finished product H such that the areas of the holes and parts of the half-finished product are separated from each other. Accordingly, the holes h of the half-finished product H are placed in the sealed chamber space 33 while the parts p are placed such that inner sides thereof are placed in the chamber space 33 and outer sides thereof are placed outside the chamber space 33.

In other words, since the holes h of the half-finished product H are placed in the sealed chamber space 33, air that moves in and out of the half-finished product H through the holes h remains in the chamber space 33. However, the parts p of the half-finished product H are placed at the inner sides thereof in the chamber space 33 and at the outer sides thereof outside the chamber space 33. Accordingly, when there are gaps in the parts p themselves or there are gaps between the parts p and the injection-molded product (when there is a problem with waterproofness), air in the chamber space 33 leaks out of the chamber space 33 through the gaps. Thus, when there is a problem with waterproofness, a pressure in the chamber space 33 is changed, and thus it is possible to test waterproofness from the change in pressure.

In addition, the sealing pad 31 may include an inner surface pad provided on an upper surface of the body 1, that is, on an upper surface of the seat part 11, and sealing the inner surface of the half-finished product H seated on the seat part 11, and an outer surface pad provided on the lower surface of the cover 2 and sealing the outer surface of the half-finished product H (in this case, the sealing part 32 is provided with the outer surface pad).

Moreover, the practice of injecting air into the chamber space 33 can be referred to in the prior inventions of the present applicant, so it can be practiced by those skilled in the art even if a detailed description thereof is omitted.

Next, the hole blocking means 4 is a key feature of the present invention, and is configured because it is difficult to seal the holes h of the half-finished product H through the sealing means 3, especially a side hole hs formed on a side of the half-finished product H.

For example, in the case of a smartphone, a typical side hole hs includes a charge hole into which a charge terminal of a charger is inserted, an earphone connection hole into which an earphone terminal is inserted, etc.

As shown in FIGS. 2A to 3B, the hole blocking means 4 includes the sliding block 41, a blocking member 42, and the pushing member 43.

First, the sliding block 41 is provided on the outer periphery of the seat part 11, and is configured to be moved in a lateral direction of the half-finished product H by forward and backward movement so that the sliding block 41 is moved toward the half-finished product H at the time of forward movement, and is moved away from the half-finished product H at the time of backward movement.

As described above, the sliding block 41 is installed on the installation surface 12 of the body 1. Accordingly, as the installation surface 12 is provided entirely or partially on the outer periphery of the seat part 11, the sliding block 41 may also be provided entirely or partially on the outer periphery of the seat part 11 of the body 1 depending on various embodiments of the present invention.

Next, the blocking member 42 is provided at a front end of the sliding block 41 and blocks the side hole hs of the holes h, the side hole hs being formed on the side of the half-finished product H. When the sliding block 41 is moved forward, the blocking member 42 seals the side hole hs while being brought into contact and pressed on the side of the half-finished product H, and when the sliding block 41 is moved backward, the blocking member 42 is separated from the side of the half-finished product H so that the side hole hs is opened.

The blocking member 42 is may be made of a material such as rubber or the like having excellent sealing performance. The blocking member 42 may be a cover type that fully covers the side hole hs, or may be a protrusion type that is fitted into the side hole hs without clearance.

Next, the pushing member 43 is provided on the lower surface of the cover 2, and pushes the sliding block 41 to move the sliding block forward when the body 1 and the cover 2 are coupled to each other. For this purpose, the pushing member 43 may come into contact with a rear end of the sliding block 41.

In other words, when the body 1 and the cover 2 are coupled to each other, the pushing member 43 provided on the lower surface of the cover 2 comes into contact with the rear end of the sliding block 41 and pushes the sliding block 41 to be moved forward.

Accordingly, in the present invention, the sliding block 41 of the hole blocking means 4 can be naturally moved forward and backward by engagement and disengagement between the body 1 and the cover 2 without requiring a separate power.

In the prior art including the prior art of the present application, high-pressure air is injected for movement of the sliding block 41 (or a corresponding structure). In this case, the number of entire parts p is increased due to the parts p for compressing and injecting air, and accordingly manufacturing cost of the apparatus is increased. In addition, precise design is required for preventing leakage of compressed air, and a jig (assembly of the body 1 and the cover 2) is increased in volume.

However, the present invention provides a unique configuration and structure by employing the pushing member 43 and the sliding block 41 so that requirement of a separate power (e.g., compressed air) can be eliminated and the above-problems can be solved. Thus, it is possible to reduce manufacturing cost of the apparatus, to reduce sensitivity to leakage of compressed air, and to minimize volume of the jig.

As shown in FIGS. 2A to 3B, the pushing member 43 may be formed as a protrusion protruding downward on the lower surface of the cover 2. Particularly, the sliding block 41 is provided at the rear end thereof with a first inclined portion 461 inclined downward and rearward, and the pushing member 43 is provided with a second inclined portion 462 corresponding to the first inclined portion 461. The second inclined portion 462 may be provided such that when the body 1 and the cover 2 are coupled to each other, the second inclined portion 462 comes into contact with the first inclined portion 461.

Here, the first and second inclined portions 461 and 462 allow the pushing member 43 to push the sliding block 41 more efficiently and easily. Accordingly, the sliding properties of the sliding block 41 by the pushing member 41 can be enhanced.

Figure 4:
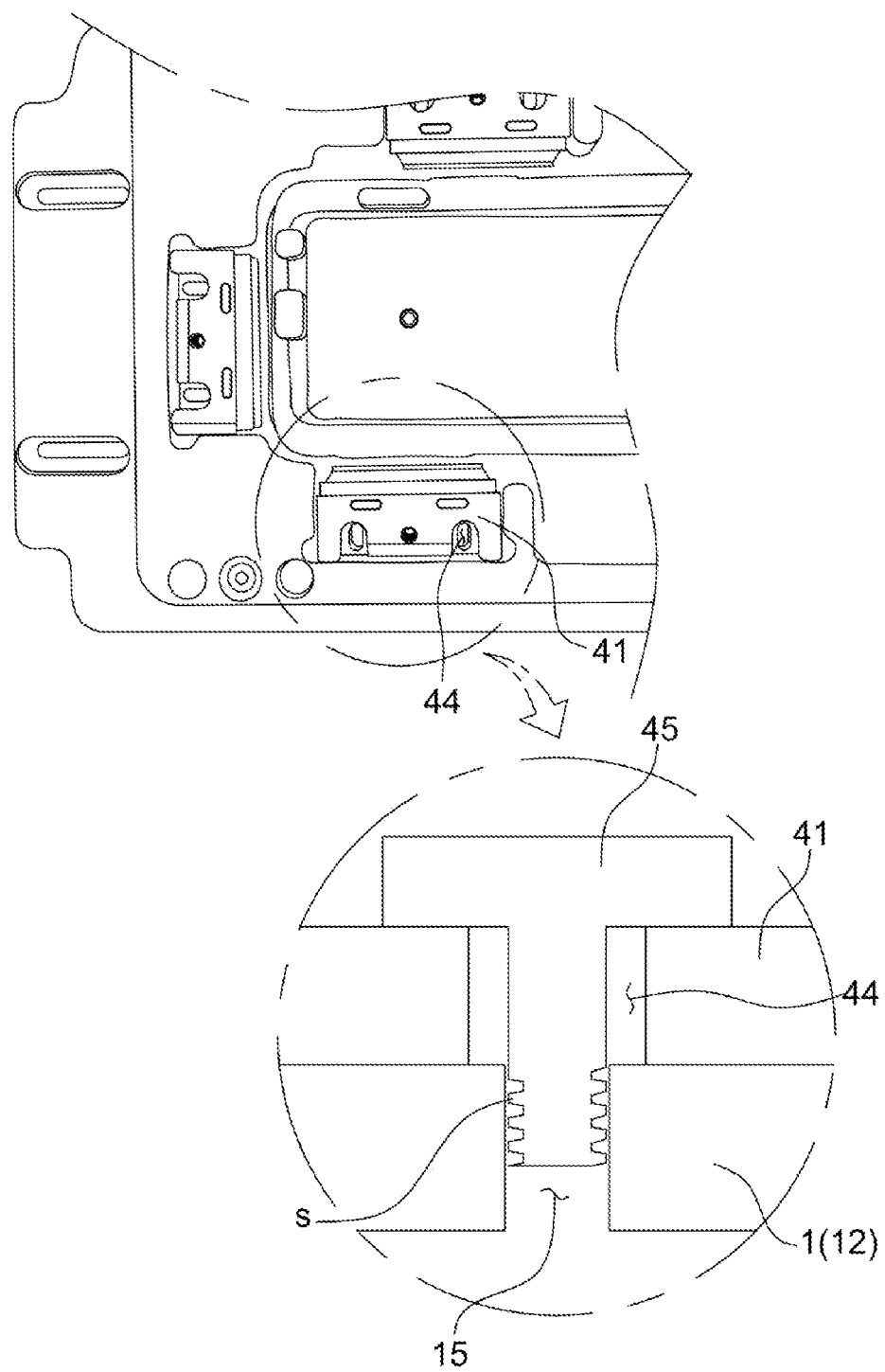
FIG. 4 is an embodiment of the present invention relating to straightness of a sliding block.

FIG. 4 shows a configuration of a guide hole 44 and a guide member 45 that are configured to impart straightness to forward and backward movement of the sliding block 41, according to an embodiment of the present invention.

As shown in FIG. 4, the apparatus D is configured such that the hole blocking means 4 includes the elongated guide hole 44 formed at the sliding block 41, and the guide member 45 coupled at an end thereof to the body 1 and inserted into the guide hole 44 such that a center portion of the guide member passes therethrough, so the guide member 45 restricts the sliding block 41.

More specifically, the guide hole 44 is formed at the sliding block 41, and may extend from the rear end of the sliding block 41 to approximately a center or further, and a major axis diameter (long diameter) of the guide hole 44 is determined by forward and backward distance of the sliding block 41.

Moreover, as can be seen from a circle area at a lower side of FIG. 4, the guide member 45 is coupled at the end (lower end) thereof to the body 1, and is inserted into the guide hole 44 such that the center portion of the guide member passes therethrough. Here, when it is required to reinforce and support engagement between the end of the guide member 45 and the body 1, the guide member 45 may be further provided with a head portion (upper end portion), such that the head portion comes into contact with an upper surface of the sliding block 41, thereby restricting a vertical displacement of the guide member.

The guide member 45 and the body 1 may be coupled to each other through screw-type engagement for ease of engagement and disengagement. Accordingly, the guide member 45 may be provided at the end thereof with a threaded portion s, and the installation surface 12 of the body 1 may be provided with a fixing groove 15 into which the end of the guide member 45 is inserted. The fixing groove 15 may be also provided with a threaded portion s.

According to the present invention having the above-configuration of the guide hole 44 and the guide member 45, it is possible to enable more stable forward and backward movement of the sliding block 41 by imparting straightness to the forward and backward movement of the sliding block 41, thereby providing more stable operation of the apparatus.

The embodiment in which the pushing member 43 allows the sliding block 41 to be moved forward when the body 1 and the cover 2 are coupled to each other was described above.

Of course, a return means may be also provided such that the sliding block 41 is allowed to move backward when engagement between the body 1 and the cover 2 is released, that is, when the body 1 and the cover 2 are separated.

Figure 5:
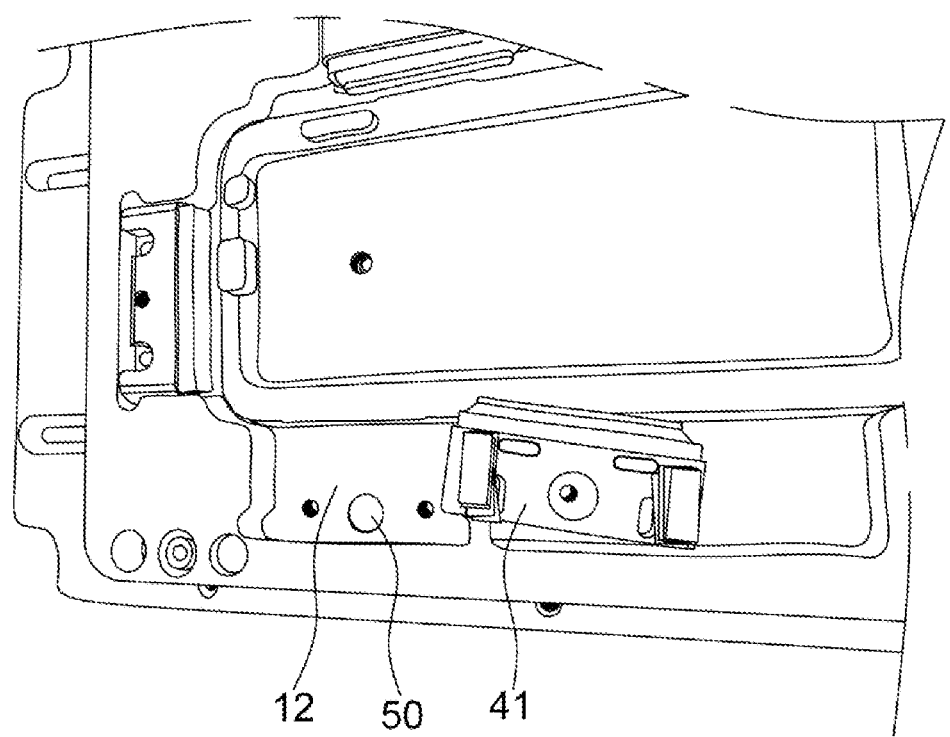
FIG. 5 is an embodiment of the present invention relating to a return of the sliding block.

As shown in FIG. 5, the apparatus D according to the embodiment of the present invention is configured such that a return member 50 for returning the sliding block 41 is provided on the installation surface 12 at a position corresponding to a lower portion of a rear end of the sliding block 41. In particular, the return member 50 is a magnetic material.

Here, of course, the sliding block 41 is made of a ferromagnetic material (typically, iron is included) so as to be able to respond to the magnetic material, and a magnetic force of the return member 50 must be at least smaller than a force that the pushing member 43 is required to have to push the sliding block.

Accordingly, the return member 50 normally attracts the sliding block 41 in a direction away from the side of the half-finished product H, and in this state, when the body 1 and the cover 2 are coupled to each other, the pushing member 43 pushes the sliding block 41 toward the half-finished product H with greater force than the return member. When the body 1 and the cover 2 are separated and interference by the pushing member 43 is removed, the return member 50 attracts the sliding block 41 so that the sliding block is returned to its original position.

Further, the return means (magnetic material) according to the embodiment of the present invention may include a return means using elasticity such as a spring.

Figure 6:
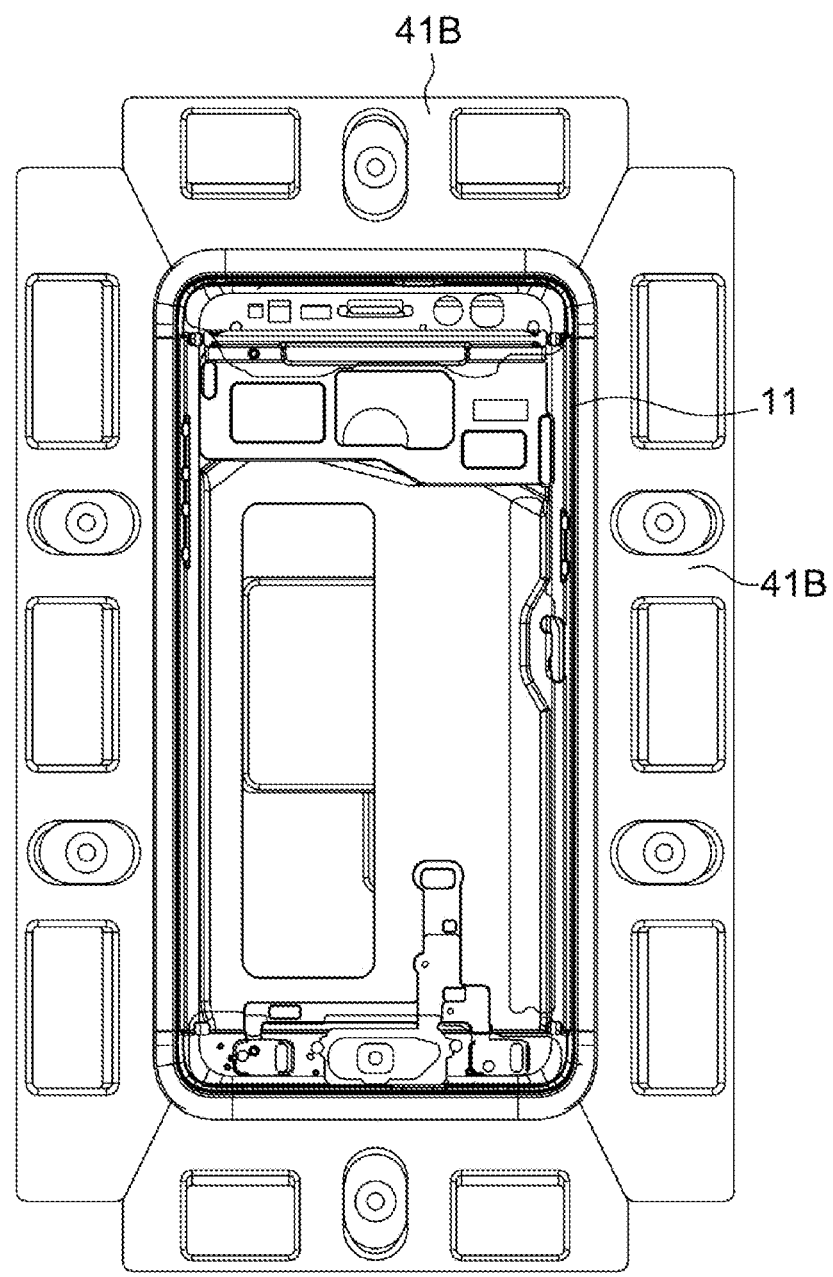
FIG. 6 is a second embodiment of the present invention.
Figure 7:
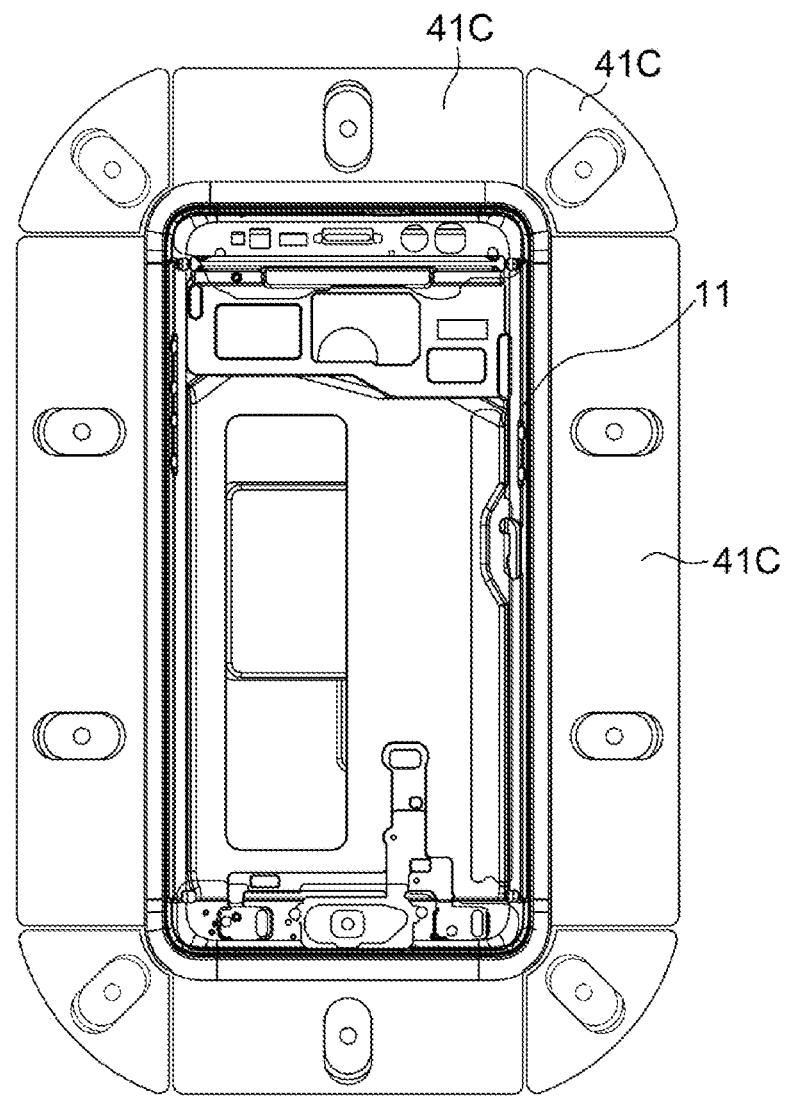
FIG. 7 is a third embodiment of the present invention.

Meanwhile, FIGS. 2A, 2B, 4, and 5 show an embodiment in which a plurality of sliding blocks are partially provided at four sides of the seat part 11 (first embodiment), FIGS. 3A and 3B, and FIG. 6 show an embodiment in which a plurality of sliding blocks are provided at four sides of the seat part 11 to entirely surround the seat part (second embodiment), and FIG. 7 shows an embodiment in which a plurality of sliding blocks are provided at four sides and at four corners of the seat part 11 to entirely surround the seat part (third embodiment).

For convenience, the sliding blocks 41 according to the first to third embodiments will be referred to as first to third sliding blocks 41A, 41B, and 41C, respectively.

As shown in FIGS. 2A and 2B, the plurality of first sliding blocks 41A according to the first embodiment are partially provided at the four sides of the seat part 11, and thus a plurality of installation surfaces 12 are provided at the four sides of the seat part 11 on the outer periphery of the seat part 11. The first sliding block 41A has an advantage that the area of movable parts (sliding blocks 41) is minimized so that the holes h of the half-finished product H are effectively blocked while structural stability remains excellent and possibility of failure is very low.

As shown in FIG. 6, the plurality of second sliding blocks 41B according to the second embodiment are provided at the four sides of the seat part 11 to entirely surround the seat part, and thus an installation surface 12 is provided along the four sides of the seat part 11 to entirely surround the seat part. In the case of the second sliding block 41B, since the movable parts (sliding blocks) are provided at the four sides of the seat part 11 to entirely surround the seat part, the second sliding block 41B has an advantage that it can be universally used in various standard half-finished products.

For example, assuming that side holes hs of a first half-finished product and side holes hs of a second half-finished product are positioned differently from each other, in the case of the first embodiment, a position of the first sliding block 41A used when testing waterproofness of the first half-finished product is different from a position of the first sliding block 41A used when testing waterproofness of the second half-finished product. Accordingly, an apparatus for testing waterproofness may be manufactured correspondingly to each of the first and second half-finished products.

However, in the case of the second embodiment, the same second sliding block 41B is used both when testing waterproofness of the first half-finished product and when testing waterproofness of the second half-finished product, while only the blocking members 42 may be positioned differently from each other. Thus, the blocking member 42 may be provided as a detachable type to change a coupling position of the blocking member 42, or the blocking member 42 may be provided at a position corresponding to the side hole hs of each of the first and second half-finished products, whereby one apparatus for testing waterproofness can be universally used in various standard half-finished products.

As shown in FIG. 7, the plurality of third sliding blocks 41C according to the third embodiment are provided at the four sides and at the four corners of the seat part 11 to entirely surround the seat part. The third sliding block 41C has a disadvantage that the number of parts p is increased compared to the first and second embodiments and the area of the movable parts (sliding blocks) is increased. However, even sealing of corners of the half-finished product can be ensured, so that excellent sealing performance can be achieved, and an apparatus for testing waterproofness can be used in various standard half-finished products.

In the detailed description of the present invention, a detailed description of an assembly means for providing engagement between the body 1 and the cover 2, a lifting means for moving the cover 2 for engagement and disengagement of the cover 2 and the like is omitted, which departs from the protective scope of the present invention, and is practiced by those skilled in the art with reference to known techniques.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for testing waterproofness of a half-finished product, the apparatus comprising:
   a body provided with a seat part on which a half-finished product having a plurality of holes formed therein and a plurality of parts mounted thereon is seated;
   a cover covering the body;
   a sealing means including a sealing pad provided between the body and the cover and sealing inner and outer surfaces of the half-finished product such that areas of the holes and the parts of the half-finished product are separated from each other, the sealing means being configured to form a chamber space for testing waterproofness of the parts; and
   a hole blocking means including a sliding block provided on an outer periphery of the seat part and movable in a lateral direction of the half-finished product by forward and backward movement, a blocking member provided at a front end of the sliding block and blocking a side hole of the holes of the half-finished product, the side hole being formed on a side of the half-finished product, and a pushing member provided on a lower surface of the cover and capable of pushing the sliding block to move the sliding block forward when the body and the cover are coupled to each other.

2. The apparatus of claim 1, wherein the sliding block is provided at a rear end thereof with a first inclined portion inclined downward and rearward, and the pushing member is provided with a second inclined portion corresponding to the first inclined portion, the second inclined portion coming into contact with the first inclined portion when the body and the cover are coupled to each other.

3. The apparatus of claim 1, wherein the hole blocking means further includes an elongated guide hole formed at the sliding block, and a guide member coupled at an end thereof to the body and inserted into the guide hole such that a center portion of the guide member passes through the guide hole, so the guide member restricts the sliding block.

4. The apparatus of claim 1, wherein the body is provided with an installation surface on which the sliding block is installed, the installation surface being provided with a return member at a position corresponding to a lower portion of the rear end of the sliding block, the return member returning the sliding block and being made of a magnetic material.

* * * * *